(12) United States Patent
Petrov et al.

(10) Patent No.: US 7,006,809 B2
(45) Date of Patent: Feb. 28, 2006

(54) ADAPTIVE DIVERSITY RECEIVER ARCHITECTURE

(75) Inventors: Andrei R. Petrov, Pocatello, ID (US); Craig L. Christensen, Pocatello, ID (US)

(73) Assignee: AMI Semiconductor, Inc., Pocatello, ID (US)

( * ) Notice: Subject to any disclaimer, the term of this patent is extended or adjusted under 35 U.S.C. 154(b) by 463 days.

(21) Appl. No.: 10/430,455

(22) Filed: May 6, 2003

(65) Prior Publication Data

US 2004/0224655 A1   Nov. 11, 2004

(51) Int. Cl.
*H04B 1/06*      (2006.01)

(52) U.S. Cl. .............................. 455/276.1; 455/277.2; 375/347

(58) Field of Classification Search ............... 455/63.1, 455/67.11, 67.13, 226.1, 226.2, 269, 272, 455/273, 276.1, 277.1, 277.2, 278.1, 280; 375/346, 347, 349
See application file for complete search history.

(56) References Cited

U.S. PATENT DOCUMENTS

| | | | |
|---|---|---|---|
| 3,961,262 A | 6/1976 | Gassmann | 325/345 |
| 4,276,513 A | 6/1981 | Johnston et al. | 330/9 |
| 4,599,743 A | 7/1986 | Reed | 455/207 |
| 4,736,390 A | 4/1988 | Ward et al. | 375/75 |
| 4,814,715 A | 3/1989 | Kasperkovitz | 329/50 |
| 4,942,365 A | 7/1990 | Satterwhite | 328/134 |
| 5,036,331 A * | 7/1991 | Dallabetta et al. | 342/361 |
| 5,086,437 A | 2/1992 | Tomita | 375/98 |
| 5,203,023 A * | 4/1993 | Saito et al. | 455/273 |
| 5,203,025 A | 4/1993 | Anvari et al. | 455/134 |
| 5,241,702 A | 8/1993 | Dent | 455/278.1 |
| 5,263,194 A | 11/1993 | Ragan | 455/316 |
| 5,442,655 A | 8/1995 | Dedic et al. | 375/340 |
| 5,461,646 A | 10/1995 | Anvari | 375/347 |
| 5,530,926 A | 6/1996 | Rozanski | 455/277.2 |
| 5,561,673 A | 10/1996 | Takai et al. | 371/5.5 |
| 5,617,060 A | 4/1997 | Wilson et al. | 330/129 |

(Continued)

FOREIGN PATENT DOCUMENTS

DE          19644965 A1        4/1998

(Continued)

OTHER PUBLICATIONS

C. Menolfi and Q. Huang, "A Low-Noise CMOS Instumentation Amplifier for Thermoelectric Infrared Detectors", IEEE J. Solid-State Circuits, vol. 32, No. 7, pp. 968-976, Jul. 1997.

(Continued)

*Primary Examiner*—Quochien B. Vuong
(74) *Attorney, Agent, or Firm*—Workman Nydegger (57) ABSTRACT

A diversity receiver circuit that adaptively selects a variable number of one or more antennas for use in improving signal quality. Each antenna is provided its own receiver that each generates a representation of a received signal. This adaptive selection offers high dynamic adaptability in using the appropriate antennas and receivers at the appropriate time to thereby improving signal-to-noise ratio. The receivers may be direct conversion receivers that implement up-conversion of the baseband signal to reduce DC offset and 1/f noise characteristic of direct conversion architectures.

29 Claims, 9 Drawing Sheets

U.S. PATENT DOCUMENTS

| | | | | |
|---|---|---|---|---|
| 5,634,204 | A | | 5/1997 | Takahashi et al. ........... 455/134 |
| 5,692,019 | A | | 11/1997 | Chang et al. ................ 375/347 |
| 5,710,995 | A | * | 1/1998 | Akaiwa et al. ........... 455/277.2 |
| 5,740,530 | A | | 4/1998 | Labedz et al. .............. 455/403 |
| 5,757,866 | A | * | 5/1998 | Kannari et al. ............. 375/347 |
| 5,761,252 | A | * | 6/1998 | Iinuma ....................... 375/347 |
| 5,818,543 | A | | 10/1998 | Lee ............................ 348/725 |
| 5,889,826 | A | | 3/1999 | Takahashi ................... 315/347 |
| 5,953,640 | A | | 9/1999 | Meador et al. ............... 455/73 |
| 6,002,672 | A | | 12/1999 | Todd .......................... 370/252 |
| 6,009,307 | A | | 12/1999 | Granata et al. ............ 455/13.3 |
| 6,018,647 | A | | 1/2000 | Fitzgerald ................... 455/135 |
| 6,023,615 | A | | 2/2000 | Bruckert et al. .......... 455/277.2 |
| 6,029,058 | A | | 2/2000 | Namgoong et al. ......... 455/324 |
| 6,044,254 | A | * | 3/2000 | Ohta et al. .................. 455/272 |
| 6,085,076 | A | | 7/2000 | Lindsay et al. .......... 455/277.1 |
| 6,148,184 | A | | 11/2000 | Manku et al. .............. 455/110 |
| 6,172,970 | B1 | | 1/2001 | Ling et al. .................. 370/347 |
| 6,175,728 | B1 | | 1/2001 | Mitama ...................... 455/323 |
| 6,188,880 | B1 | | 2/2001 | Sanielevici ................. 455/296 |
| 6,192,225 | B1 | | 2/2001 | Arpaia et al. ............ 455/196.1 |
| 6,212,244 | B1 | | 4/2001 | Davidovici et al. ......... 375/345 |
| 6,225,848 | B1 | | 5/2001 | Tilley et al. ................. 327/307 |
| 6,246,867 | B1 | | 6/2001 | Jakobsson ................... 455/324 |
| 6,249,249 | B1 | | 6/2001 | Obayashi et al. ........... 342/371 |
| 6,256,484 | B1 | * | 7/2001 | Conner et al. ........... 455/277.1 |
| 6,275,542 | B1 | | 8/2001 | Katayama et al. .......... 375/322 |
| 6,327,313 | B1 | | 12/2001 | Traylor et al. .............. 375/316 |
| 6,330,433 | B1 | | 12/2001 | Jagar ....................... 455/277.2 |
| 2001/0016478 | A1 | | 8/2001 | Lindenmeier et al. ... 455/277.1 |

FOREIGN PATENT DOCUMENTS

| | | |
|---|---|---|
| EP | 0419674 A1 | 4/1991 |
| EP | 1215814 A2 | 6/2002 |

OTHER PUBLICATIONS

C.C.Enz, E.A. Vittoz, and F. Krummenacher, 'A CMOS Chopper Amplifier', IEEE J. Solid-State Circuits, vol. SC-22, No. 3, pp. 335-342, Jul. 1987.

D.K. Weaver, Jr., "Third Method of Generation and Detection of Single-Sideband Signals", Proc. IRE, PP 1703-1705, Jun. 1956.

* cited by examiner

ADAPTIVE DIVERSITY RECEIVER ARCHITECTURE

BACKGROUND OF THE INVENTION

1. The Field of the Invention

The present invention relates to analog integrated circuit design, and more particularly, to a direct conversion receiver that processes constant envelope phase and frequency modulated signals.

2. Background and Related Art

Electrical signals have proven to be an effective means of conveying data from one location to another. The further a signal is transmitted, however, the greater the decay in the signal and the greater the chance for irreversible loss in the data represented by the signal. In order to guard against this signal decay, the core electrical signal that represents the data (i.e., the baseband signal) may be modulated or superimposed on a carrier wave in the Radio Frequency (RF) frequency spectrum.

In order to properly interpret the signal, conventional RF receivers extract the baseband signal from the received signal. The data represented by the extracted baseband signal may then be interpreted by other downstream circuitry. In order to perform this extraction, typical receivers include circuitry which first converts the received radio frequency modulated signal into an intermediate frequency ("IF") signal. This intermediate frequency signal is then converted into the baseband signal for further data processing. Receiver architectures that convert through the intermediate frequency are often called "heterodyne" receiver architectures. Naturally, circuit elements (called "IF components") are required in order to deal with the intermediate conversion to and from the intermediate frequency.

It is desirable to reduce the cost, size, and power consumption of a particular receiver architecture design for strategic marketing of the receiver. This is particularly true of wireless RF receivers since those receivers are often portable and run on battery power.

One technology developed in order to reduce RF receiver cost, size, and power consumption is called "direct conversion." Direct conversion refers to the direct conversion of RF modulated signals into corresponding baseband signals without requiring conversion through the intermediate frequency. Such direct conversion receiver architectures are often also called "zero-IF," "synchrodyne," or "homodyne" receiver architectures.

Figure 7:
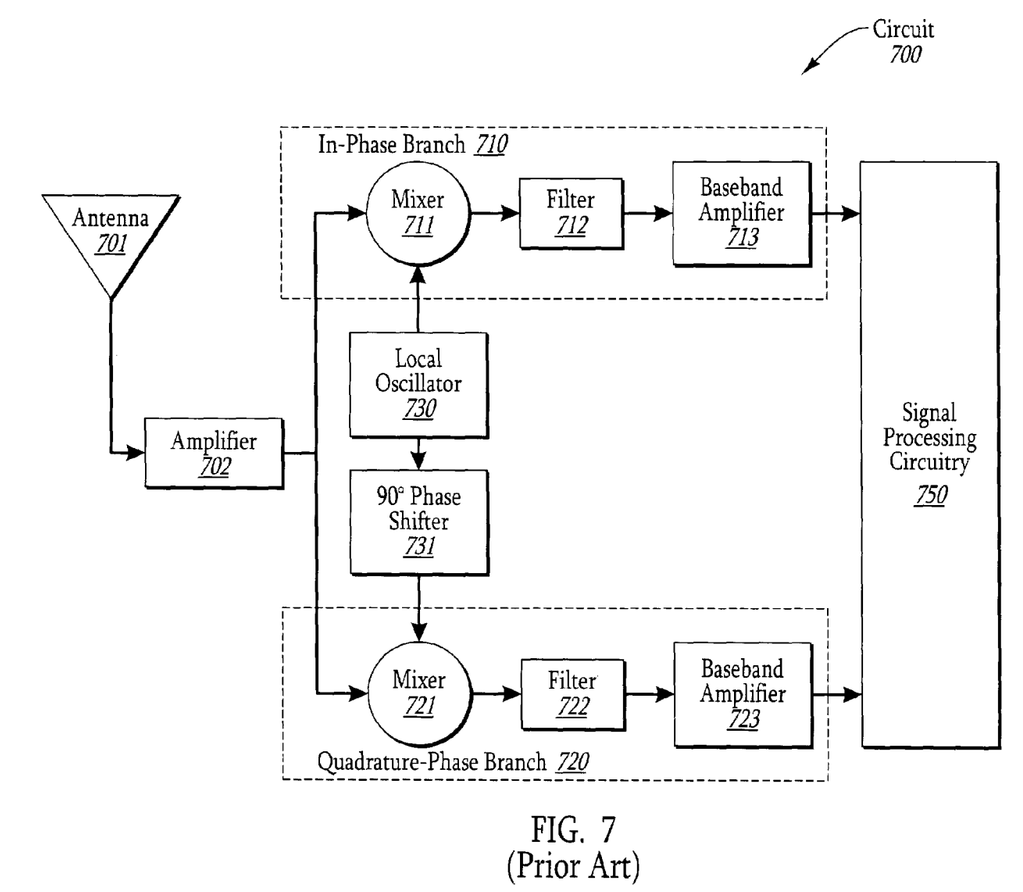
FIG. 7 illustrates a high-level circuit schematic of a direct conversion circuit in accordance with the prior art.

FIG. 7 illustrates a conventional direct conversion circuit 700 in accordance with the prior art. The circuit 700 includes an antenna 701 which receives the RF modulated signal. The antenna 701 then provides the received signal to an amplifier 702 which amplifies the signal for further processing. The amplifier 702 may be, for example, an RF low noise amplifier.

The amplified signal is then split into two branches, an "in-phase" branch 710, and a "quadrature-phase" branch 720. Each branch includes a mixer that initially receives the amplified signal. For instance, the in-phase branch 710 includes an in-phase mixer 711, and the quadrature-phase branch 720 includes a quadrature-phase mixer 721. A local oscillator 730 provides a sine or square wave signal as a control signal to each of the mixers. Each mixer is configured to nonlinearly process the amplified signal and control signal, resulting in output signal components at frequencies equal to the sum and difference of amplified signal and control signal frequencies, plus higher-order components at other frequencies. The circuit includes a 90-degree phase shifter 731 which causes the control signal for the quadrature-phase mixer 721 to be 90 degrees out of phase with the control signal for the in-phase mixer 711.

The signal from the in-phase mixer 711 is then passed through a low pass filter 712 to a baseband amplifier 713 to complete the extraction of the baseband (difference frequency) signal from the received signal as far as the in-phase branch 710 is concerned. Likewise, the signal from the quadrature-phase mixer 721 is passed through a low pass filter 722 to a baseband amplifier 723 to complete the extraction of the baseband (difference frequency) signal as far as the quadrature-phase branch is concerned. The in-phase and quadrature-phase baseband signals are then processed by signal processing circuitry 750.

The direct conversion circuit of FIG. 7 does not convert through an intermediate frequency and thus there are no IF components needed to deal with an intermediate conversion. Consequently, the direct conversion circuit of FIG. 7 is smaller, and requires less power than conventional heterodyne receiver architectures. Furthermore, the direct conversion circuit does not have to deal with image suppression as much as do heterodyne receivers. Accordingly, direct conversion receivers have many advantages over heterodyne receiver architectures. Unfortunately, direct conversion architectures characteristically introduce more DC offset and 1/f noise than do heterodyne receiver architectures thereby limiting dynamic range.

In a direct conversion receiver architecture, as in heterodyne receiver architectures, it is often desirable to implement antenna diversity. Antenna diversity involves the use of more than one antenna to receive a signal to improve the ability to properly receive the signal. When using one antenna to receive a signal, the signal may have actually taken several paths from the transmitter to the receiver, each having a different length. This causes an echo effect that might actually lead to destructive interference between the signals receive from different paths. The use of two or more antennas that are appropriately spaced reduces the degradation due to the echo effect since the echo at one antenna will typically be different than the echo at another, thereby reducing the likelihood that the echo would degrade the signal.

The use of multiple antennas is also helpful to improve signal-to-noise ratio even if there is no echo effect. By coherently adding the two versions of signal together, the signal-to-noise ratio may improve by a factor of the square root of the number of antennas in the diversity receiver system. Conventional antenna diversity systems that perform such coherent adding of the signal consistently add the two signals together without reverting back to a single antenna system when one of the antennas is not picking up a good signal.

Accordingly, a diversity receiver would be advantageous in which the antenna selection is adaptively determined based on the ability of an antenna at any given point in time to properly receive the signal. It would further be advantageous if such a diversity receiver could implement direct conversion receivers, especially if such direct conversion receivers had reduced DC offset and 1/f noise as compared to conventional direct conversion receivers.

BRIEF SUMMARY OF THE INVENTION

The foregoing problems with the prior state of the art are overcome by the principles of the present invention, which are directed towards a diversity receiver circuit that adaptively selects which one or more antennas to use to improve signal processing. Each antenna is provided its own receiver, each receiver generating a representation of the received signal. The receivers may be direct conversion receivers that implement up-conversion of the baseband signal to reduce DC offset and 1/f noise characteristic of direct conversion architectures.

The diversity receiver may phase shift sum all of the respective representations of the signals received via all the antennas if the signal strength is sufficient from each of the antennas. Alternatively, one or more receivers may be adaptively disconnected from the summing operations if they have too weak of a signal to contribute positively to the summed signal. If one representation of the signal is all that has sufficient strength, then that may be the only representation of the signal provided to the signal processor.

The signals are summed in a manner that the phase of one representation is relatively fixed with respect to another representation of the phase, thereby improving the predictability in improving the signal-to-noise ratio. Furthermore, the adaptive antenna and receiver selection is not limited to all or just one of the antennas being selected, and may change the number of receivers whose resulting signals are summed depending on the then existing circumstances. Accordingly, more appropriate antenna selection may be accomplished thereby often improving signal-to-noise ratio.

The components of the diversity receiver architecture may all be fabricated using conventional CMOS processes thereby allowing the diversity receiver to be implemented all on a single die or chip.

Additional features and advantages of the invention will be set forth in the ion that follows, and in part will be obvious from the description, or may be learned practice of the invention. The features and advantages of the invention may be and obtained by means of the instruments and combinations particularly pointed out pended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention are directed towards a diversity receiver circuit that adaptively selects a variable number of one or more antennas to use to improve signal processing. Each antenna is provided its own receiver that each generates a representation of a received signal. This adaptive selection offers high dynamic adaptability in using the appropriate antennas and receivers at the appropriate time thereby improving signal-to-noise ratio. The receivers may be direct conversion receivers that implement up-conversion of the baseband signal to reduce DC offset and 1/f noise characteristic of direct conversion architectures.

In this description and in the claims, one node in a circuit is "coupled" to another node in the circuit if charge carriers freely flow (even through some devices and/or with some resistance) between the two nodes during normal operation of the circuit. One node in a circuit is "capacitively coupled" to another node in the circuit if there are one or more capacitors that intervene between the two nodes. One node in a circuit is "at least capacitively coupled" to another node if the two nodes are either coupled together as just defined, or are capacitive coupled together as just defined.

In this description and in the claims, a signal being "down-converted" means that the signal is operated upon such that its frequency spectrum tends more towards lower frequencies as compared to before the operation, the operation occurring without any loss in the core data represented by the signal. A signal being "up-converted" means that the signal is operated upon such that its frequency spectrum tends more towards higher frequencies as compared to before the operation, the operation also occurring without any loss in the core data represented by the signal.

In this description and in the claims, two signals being "phase shift" summed means that the two signals are summed while maintaining a relatively fixed phase shift between the signals within the tolerances allowable by a phase detector. The relatively fixed phase shift should be at least ten degrees, but is preferably a ninety degree phase shift to maximize signal to noise obtainable from the two signals.

Figure 1:
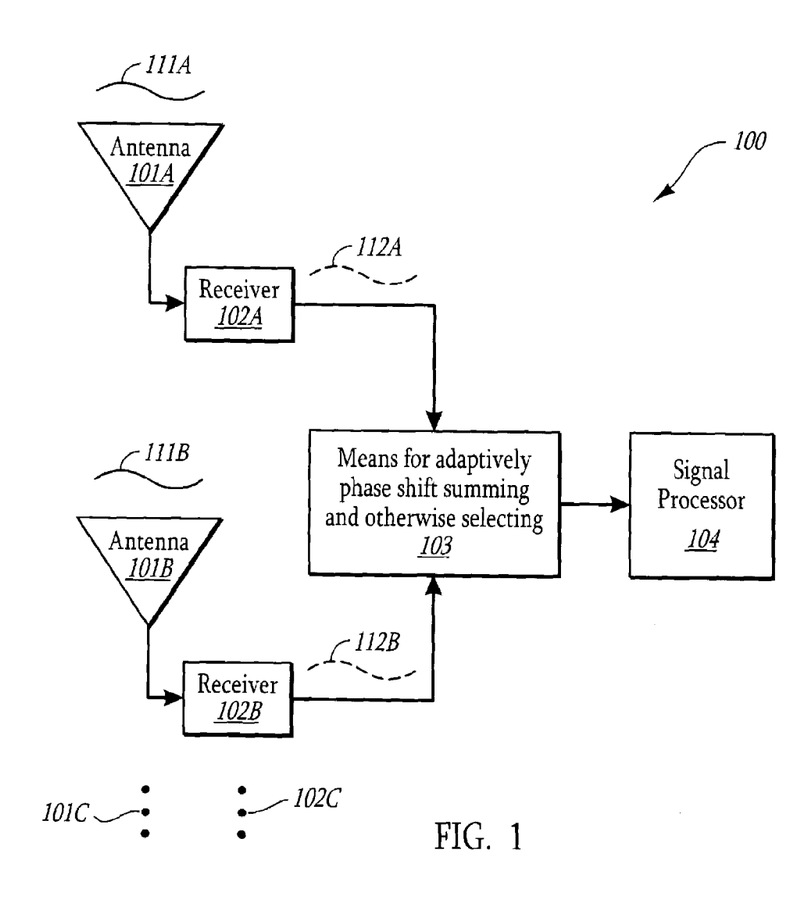
FIG. 1 illustrates a schematic diagram of a diversity receiver circuit that adaptively selects one or more antennas and receivers for further processing in accordance with the principles of the present invention.

FIG. 1 illustrates a diversity receiver circuit 100 in accordance with the principles of the present invention. The diversity receiver circuit 100 includes a first antenna 101A that receives a first representation of a signal 111A over-the-air and converts that signal into a first representation of the signal on the wire. A first receiver 102A receives and processes the first representation of the signal to generate a processed first representation 112A of the signal (also hereinafter referred to as "received signal 112A").

The diversity receiver circuit 100 also includes a second antenna 101B that receives a second representation of a signal 111B over-the-air and converts that signal into a second representation of the signal on the wire. A second receiver 102B receives and processes the second representation of the signal to generate a processed second representation 112B of the signal (also hereinafter referred to as "received signal 112B").

The diversity receiver circuit 100 may even include more antennas and corresponding receivers as represented by vertical ellipses 101C and 102C that each generate their own received signals.

The received signals from each receiver are provided to a means for (element 103) adaptively phase shift summing the received signals only if the received signals all have sufficient strength, and otherwise selecting less than all of the received signals for further processing. The summed signal(s) or selected received signal is then provided to a signal processor 104 for further processing. Accordingly, the diversity receiver circuit 100 sums all received signals, or selects less than all or even one of the received signals for further processing should circumstances warrant. The ability to adapt in this manner typically improves signal-to-noise ratio of the signal processed by the signal processor 104.

The means 103 may include any corresponding structure and materials for accomplishing this result. All such structures are intended to be encompassed within the scope of the present invention. It would be impossible to outline all structures that fall within the scope of the present invention. However, FIGS. 2A, 2B, 2C and 3 illustrated specific examples of the means 103 for adaptively phase shift summing the received signals only if the received signals all have sufficient strength, and otherwise selecting less than all of the received signals for further processing.

Figure 2A:
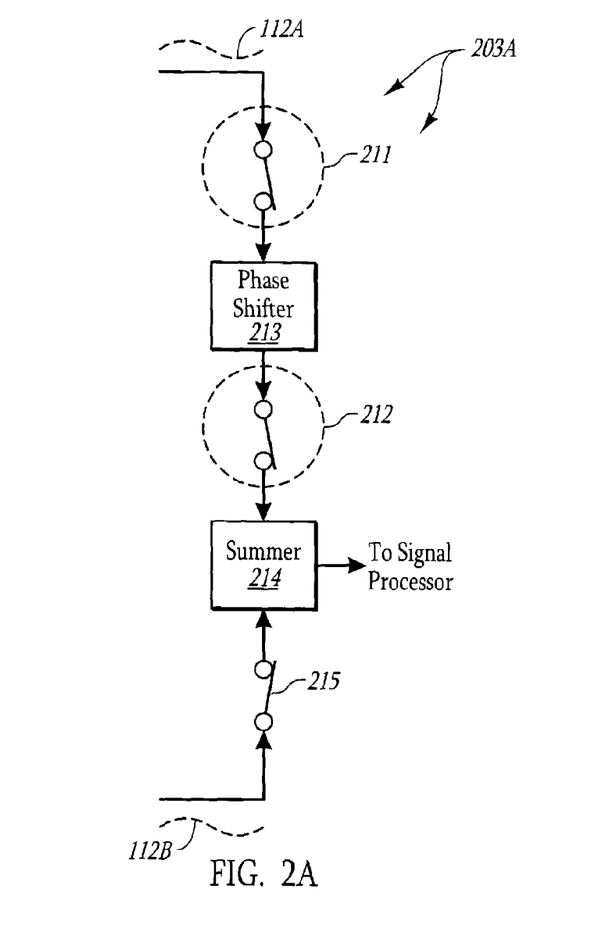
FIG. 2A illustrates one example of a means for phase shift summing and otherwise selecting less than all representations of a received signal.
Figure 2B:
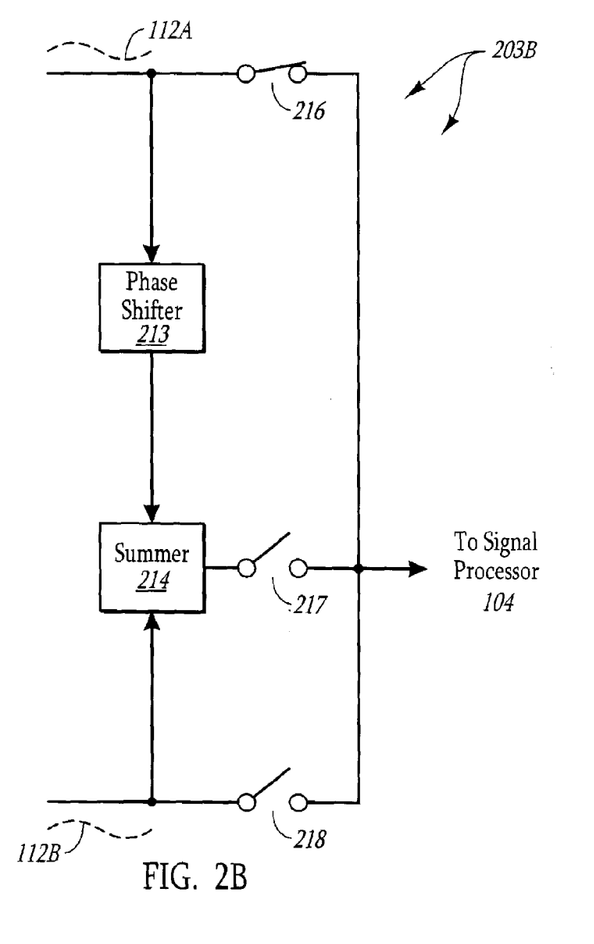
FIG. 2B illustrates a second example of a means for phase shift summing and otherwise selecting less than all representations of a received signal.
Figure 2C:
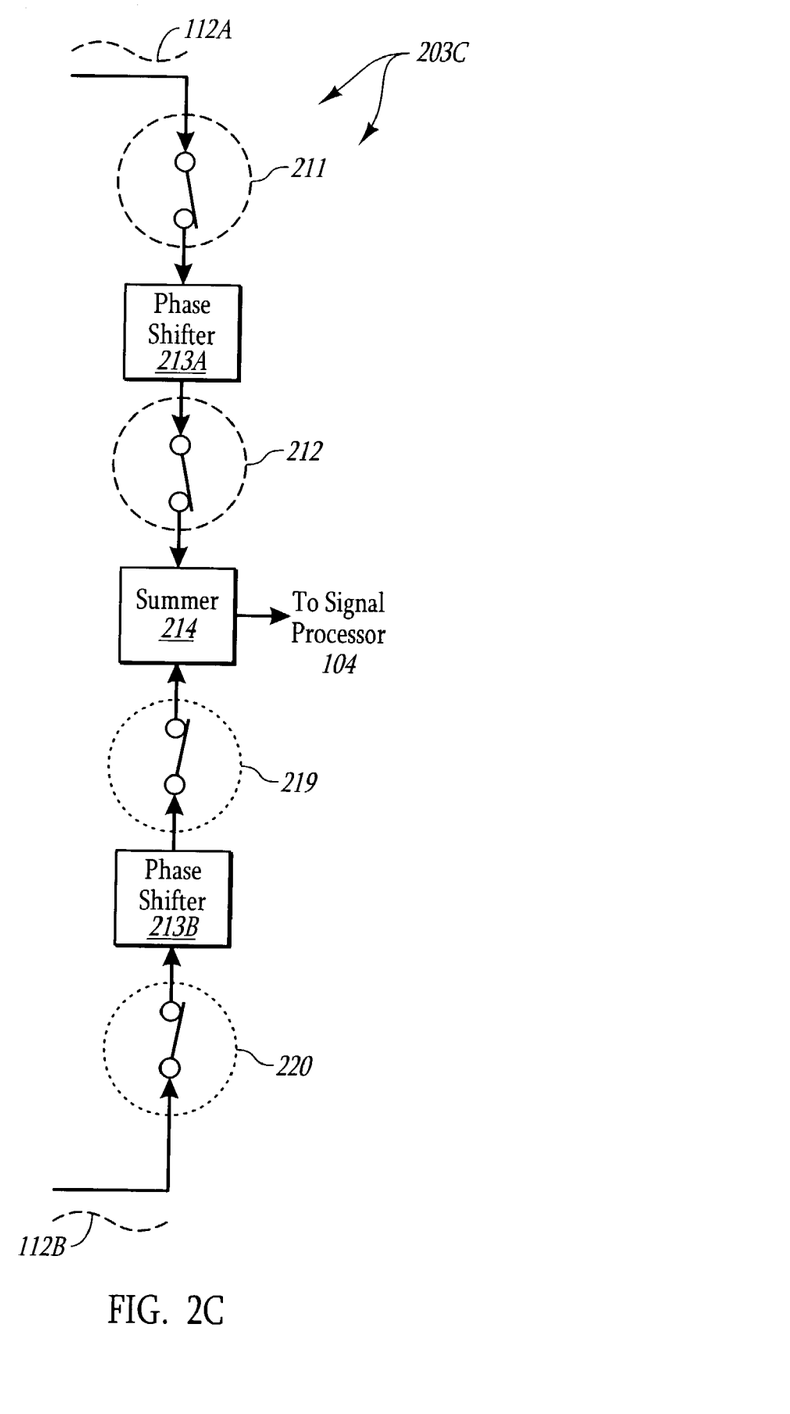
FIG. 2C illustrates a third example of a means for phase shift summing and otherwise selecting less than all representations of a received signal.
Figure 3:
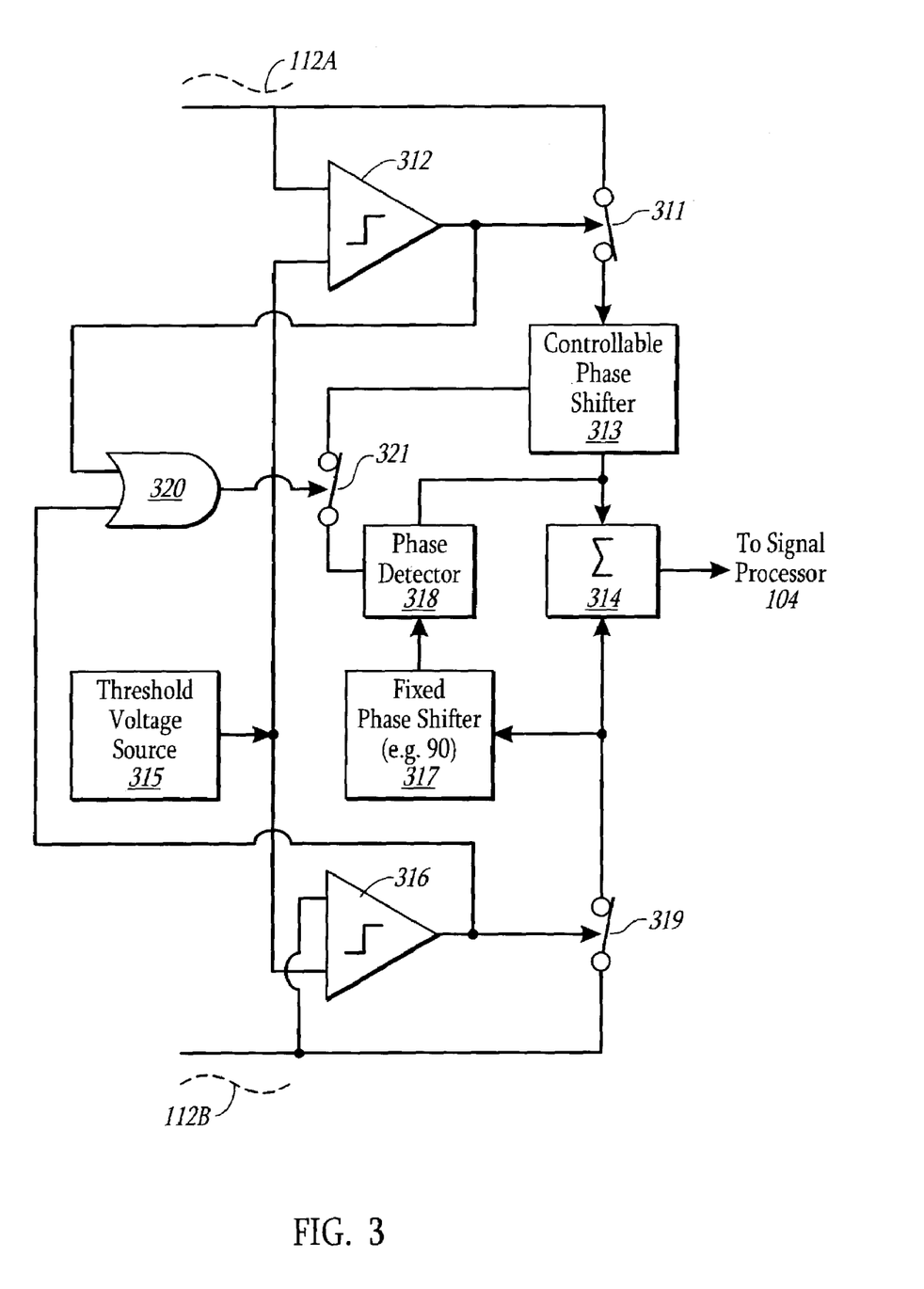
FIG. 3 illustrates a fourth and more specific example of a means for phase shift summing and otherwise selecting less than all representations of a received signal.

Each of the means of FIGS. 2A, 2B, 2C and 3 include a phase shifter (e.g., phase shifter 213 in FIGS. 2A and 2B, phase shifter 213A of FIG. 2C, and phase shifter 313 of FIG. 3). The phase shifter is configured to receive the processed first received signal 112A at least when the first received signal exceeds a first threshold value. The phase shifter further generates a phase shifted version of the first received signal at least when the first received signal exceeds the first threshold value.

A summer (e.g., summer 214 of FIGS. 2A, 2B and 2C; and summer 314 of FIG. 3) sums the phase shifted version of the first received signal with the second received signal when both of the following conditions are true: 1) the processed first received signal exceeds the first threshold value, and the processed second received signal exceeds a second threshold value. Note that the first and second threshold values may be different or the same. In FIG. 3, the first and second threshold voltages used for comparison are provided by the threshold voltage source 315 on a common wire and thus are the same, although that need not be the case.

In the circuit 203A of FIG. 2A, the phase shifter 213 may be selectively coupled to the first received signal 112A, or may alternatively be selectively coupled to the summer 214. Although both switches 211 and 212 are shown, only one or the other is present. If the switch 211 is present, the switch 211 is closed when the first received signal exceeds the first threshold value, and otherwise is open. Accordingly, the phase shifter 213 would phase shift the first received signal only when the first received signal exceeds the first threshold value. If the switch 212 is present, the phase shifter 213 always receives and phase shifts the first received signal. However, the summer 214 would only receive the phase-shifted version of the first received signal if the first received signal exceeds the first threshold value. Alternatively, both switches 211 and 212 could be present.

The switch 215 is closed when the second received signal exceeds the second threshold value. The phase shifter 213 is configured such that both representations of the first and second received signals are either synchronized or have a relatively fixed phase offset with respect to each other. Accordingly, the summer 214 of FIG. 2A provides the summed version of the first and second representations if both received signal have sufficient strength. Alternatively, if one of the received signals is too weak, the summer 214 provides only the stronger of the two signals to the signal processor 104.

The circuit 203B of FIG. 2B illustrates an alternative structure in which the phase shifter 213 always receives and phase shifts the first received signal, and in which the summer always sums the phase-shifted version of the first received signal with the second received signal. However, switch 217 may only be closed when both received signals are of sufficient strength, switch 216 may only be closed when just the first received signal is of sufficient strength, and switch 218 may only be closed when just the second received signal is of sufficient strength.

The circuit 203C of FIG. 2C illustrates an alternative structure in which the phase shifter 213A is configured very similar to the structure described above with respect to the circuit 203A of FIG. 2A. In this case, however, a second phase shifter 213B is added. Although both switches 219 and 220 are shown, only one or the other is present. If the switch 220 is present, the switch 220 is closed when the second received signal exceeds the second threshold value, and otherwise is open. Accordingly, the phase shifter 213B would phase shift the second received signal only when the second received signal exceeds the second threshold value. If the switch 219 is present, the phase shifter 213B always receives and phase shifts the second received signal. However, the summer 214 would only receive the phase-shifted version of the second received signal if the second received signal exceeds the second threshold value. Alternatively, both switches 219 and 220 could be present.

FIG. 3 illustrates a more specific example of the means 103. A first comparator 312 receives and compares the first received signal 112A and a threshold value generated by threshold voltage source 315, and closes the switch 311 if the first received signal 112A exceeds the threshold value. A second comparator 316 receives and compares the second received signal 112B and the threshold value, and closes the switch 319 if the second received signal 112B exceeds the threshold value.

If only the first received signal 112A has sufficient magnitude, then the first received signal 112A passes through a controllable phase shifter 313, and the phase-shifted version of the first received signal passes through the summer 314 unchanged since the switch 319 is open. If only the second received signal 112B has sufficient magnitude, then the second receive signal 112B passes through the summer 314 unchanged since the switch 311 is open.

If both the received signals have sufficient strength, then the second received signal 112B is provided not only to the summer 114, but also to a fixed phase shifter 317 that imposes a fixed phase shift on the second received signal 112A. In one embodiment, the fixed phase shifter 317 imposes a phase shift of ninety degrees. A phase detector 318 compares the phase-shifted version of the first received signal with the phase-shifted version of the second signal, and controls the controllable phase shifter 313 so that the phase-shifted version of the first and second signals are approximately synchronized. Or gate 320 ensures that phase detector 318 will be controlling the controllable phase shifter so long as both the first or second received signals are of sufficient strength. Accordingly, the summer 314 receives a phase-shifted version of the first received signal that is approximately ninety-degrees out of phase with the second received signal received at the summer. Such a phase shift improves signal-to-noise of the summed signal by approximate a factor of the square root of two as compared to the received signals individually.

Figure 4:
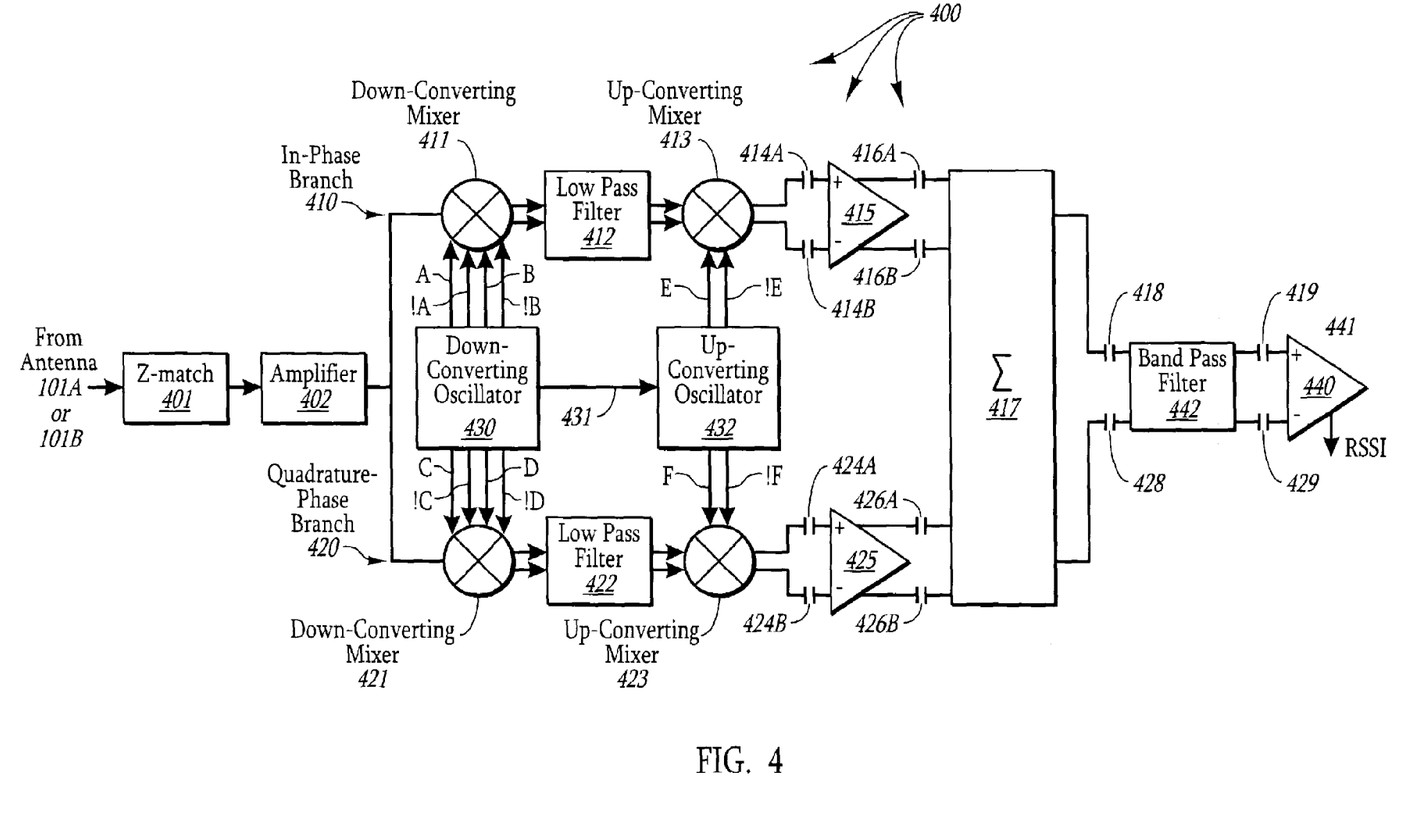
FIG. 4 illustrates a circuit diagram of a direct conversion receiver that implements up-conversion on the baseband signal and that may be used as one or both of the receivers of FIG. 1 in accordance with the principles of the present invention.

FIG. 4 illustrates a specific example of receiver 102A and/or 102B of FIG. 1. In particular, the receiver 400 includes an in-phase amplifier 415 that receives and amplifies an in-phase differential signal that represents an in-phase portion of the received signal. A quadrature-phase amplifier 425 receives and amplifies the quadrature-phase differential signal that represents a quadrature-phase portion of the received signal. The summer 417 has two differential inputs and one differential output for summing each of the in-phase and quadrature-phase signals. A band pass filter 442 receives the amplified in-phase and quadrature-phase summed signals. A limiting amplifier 440 receives and amplifies the differential summed and filtered in-phase and quadrature-phase signals.

The output of the limiting amplifier 440 may be the received signal 112A of FIG. 1 if the receiver 400 obtains the signal from the antenna 101A. Otherwise, the output of the limiting amplifier 440 may be the received signal 112B of FIG. 1 if the receiver 400 obtains the signal from the antenna 101B.

An amplifier 402 amplifies the signal received from the antenna so as to generate a signal of sufficient magnitude upon which to perform subsequent operations. An impedance matching circuit 401 operates to match the impedance of the antenna and the input impedance of the amplifier 402 so as to improve admittance of the signal from the antenna to the remaining circuitry. The impedance matching circuit 401 receives the signal from antenna 101A if the receiver 400 is an example of receiver 102A, and otherwise receives the signal from antenna 101B if the receiver 400 is an example of receiver 102B.

Such impedance matching reduces reflectance of the signal and improves power transfer as is known to those or ordinary skill in the art. The frequency response of the impedance matching circuit 401 also acts as a band pass filter, which is useful to filter out harmonics of the down-converting oscillator 430. The amplifier 402 may be a low noise amplifier of the type commonly used to amplify a received signal in direct conversion receiver circuits.

The amplified signal from the amplifier 402 is then provided to an in-phase branch 410, and to a quadrature phase branch 420. For example, signals that are passed through the in-phase branch 410 are first provided to a down-converting single input to differential output mixer 411, which down-converts the signal to thereby extract the baseband signal. A down-converting oscillator 430 provides control signals A, B, !A and !B. Control signals A and B each having a duty cycle of approximately twenty-five percent and are approximately 180 degrees out of phase with each other. Control signals !A and !B are the binary complement of control signals A and B, respectively.

These control signals may be cycled at approximately the frequency of the carrier frequency of the received signal. However, to achieve a substantial reduction in DC offset resulting from the self-mixing product of the mixer 411 at its output terminals, the mixer control signals A, B, !A and !B are operated at a twenty-five percent duty cycle at the frequency of the received signal. Furthermore, control signals A and B (and !A and !B) shift 180 degrees relative to each other. Thus results in the leakage combination being a square wave at twice the frequency of the received signal. This reduction in DC offset stems from the fact that even if the control signals were to irradiate back to the antenna (and thus introduce feedback into the mixer), the leakage component would be twice the frequency of the carrier frequency of the signal, thereby resulting in very little DC component in the self-mixing product.

Additionally, the mixer 411 has a differential output results in a reduction of second-order intermodulation product (also often referred to as "IP2"). The second-order intermodulation product is a product of a squaring function. Accordingly, the polarity of the second-order intermodulation product will be the same for each of the differential outputs of the mixer 411. Accordingly, the second-order intermodulation product manifests itself as a common mode signal at the differential output terminals of the mixer 411. The common mode rejection capability of subsequent circuitry that operates on the signal will thus reduce the effect of the second-order intermodulation product.

The signal output from the mixer 411 will not only include the baseband signal having the data of interest, but will also include higher frequency components that do not contain the desired data. Accordingly, the output signals from the mixer 411 are passed through a low pass filter 412 to remove the higher frequency components including all out of band signals and noise as well as the potential secondary image created by the up-converting mixer 413. The output from the low pass filter 412 will thus include only the baseband signal having the data of interest. This low pass filter 412 may be a passive element such as a Resistor-Capacitor (RC) filtering circuit. The low pass filter 412 should have a cutoff frequency that provides sufficient channel selectivity of the baseband signal. This may be accomplished using a four pole low pass filter composed of four RC low pass filters cascaded in series. By so doing, a roll-off of 80 decibels per decade may be accomplished. The use of a passive low pass filter allows for reduced or even eliminated DC offset since such passive elements do not generate the same 1/f noise that active elements do. Also, the use of the passive filter does not significantly reduce dynamic range in the way that an active filter would. The passive components of low pass filter 412 assures that there will not be any consequential degradation of the desired signal by flicker noise and that only a small amount of white noise is added.

Typically, in conventional direct conversion receiver circuits, the baseband signal itself is processed by active elements (such as high sensitivity amplifiers) in downstream circuitry. However, such active elements introduce significant 1/f noise since the baseband signal has a frequency spectrum tending towards lower frequencies. "1/f noise" refers to an effect whereby active elements introduce more noise when operating on lower frequencies, than they do on higher frequencies. Such an effect is common in any active elements. In accordance with the principles of the present invention, active elements do not operate upon the baseband signal itself, but on an up-converted version of the baseband signal. Accordingly, the noise introduced by the active element on the up-converted version of the baseband signal is much lower thereby preserving the dynamic range of the direct conversion receiver as a whole.

Specifically, the filtered baseband signal output by the low pass filter 412, is passed to an up-converting mixer 413 controlled by control signals E and !E provided by an up-converting oscillator 432. The control signals E and !E have a duty cycle of approximately 50% (or 25%) and are 180 degrees out of phase with each other. Additionally, the cycle frequency of the control signals E and !E is equal to the cycle frequency of the control signals A, B, !A and !B divided by some positive integer greater than one. In order to accomplish this, the down-converting oscillator 430 and the up-converting oscillator 432 may be interconnected as illustrated by arrow 431 so to enforce this frequency division relationship. This may be accomplished using conventional frequency division circuitry. Accordingly, the mixer 413 outputs an up-converted version of the baseband signal, which has a frequency spectrum tending towards higher frequencies than does the baseband signal itself. The frequency of the mixer 413 may be chosen in conjunction with the low pass filter 412 cutoff frequency to provide a desired level of image suppression from input signals spaced at integer multiples of the lower frequency of the mixer 413 from the baseband output of the mixer 411. Thus, the modifications of the direct conversion architecture not only provide reduction in DC offset and 1/f noise, but also retain the benefit of image suppression characteristic of direct convention receiver circuits. Amplification may be performed on the intermediate frequency signal output by the up-converted mixer 413 without the flicker noise of the amplifier introducing consequential degradation into the signal.

The downstream circuitry that includes active elements then operates directly on this higher frequency version of the baseband signal. Accordingly, the active components, such as amplifier 415 do not introduce as much 1/f noise. Furthermore, the subsequent circuitry may be interconnected via intervening capacitors since a higher frequency signal is being processed. This reduces and potentially even eliminates the impact of any DC offset or drift introduced by the active components as well. For instance, the differential outputs of the up-converting mixer 413 are passed to the amplifier 415 via capacitors 414A and 414B. The differential outputs of the amplifier 415 may be provided to the summer 417 via capacitors 416A and 416B. The output of the summer 417 may be provided to the limiting amplifier via capacitor 418.

The quadrature-phase branch 420 is similar to the in-phase branch 410 in that the down-converting mixer 423, control signal C, control signal D, control signal !C, control signal !D, low pass filter 422, up-converting mixer 423, control signal F, control signal !F, capacitors 424A and 424B, amplifier 425, capacitors 426A and 426B, summer 427 and capacitors 428 may have the same structure and interconnections as described above for their respective elements in the in-phase branch. However, the control signals C, D, !C, !D, F and !F will be 90 degrees out of phase with respective signals A, B, !A, !B, E and !E.

The use of a quadrature-phase branch 420 is helpful in that it allows the receiving cycle to be asynchronous with the modulation cycle. However, in the event that the in-phase branch 410 is synchronized with the modulation cycle of the received signal without the use of the quadrature-phase branch 420, the quadrature-phase branch 420 would not strictly be necessary.

Figure 5A:
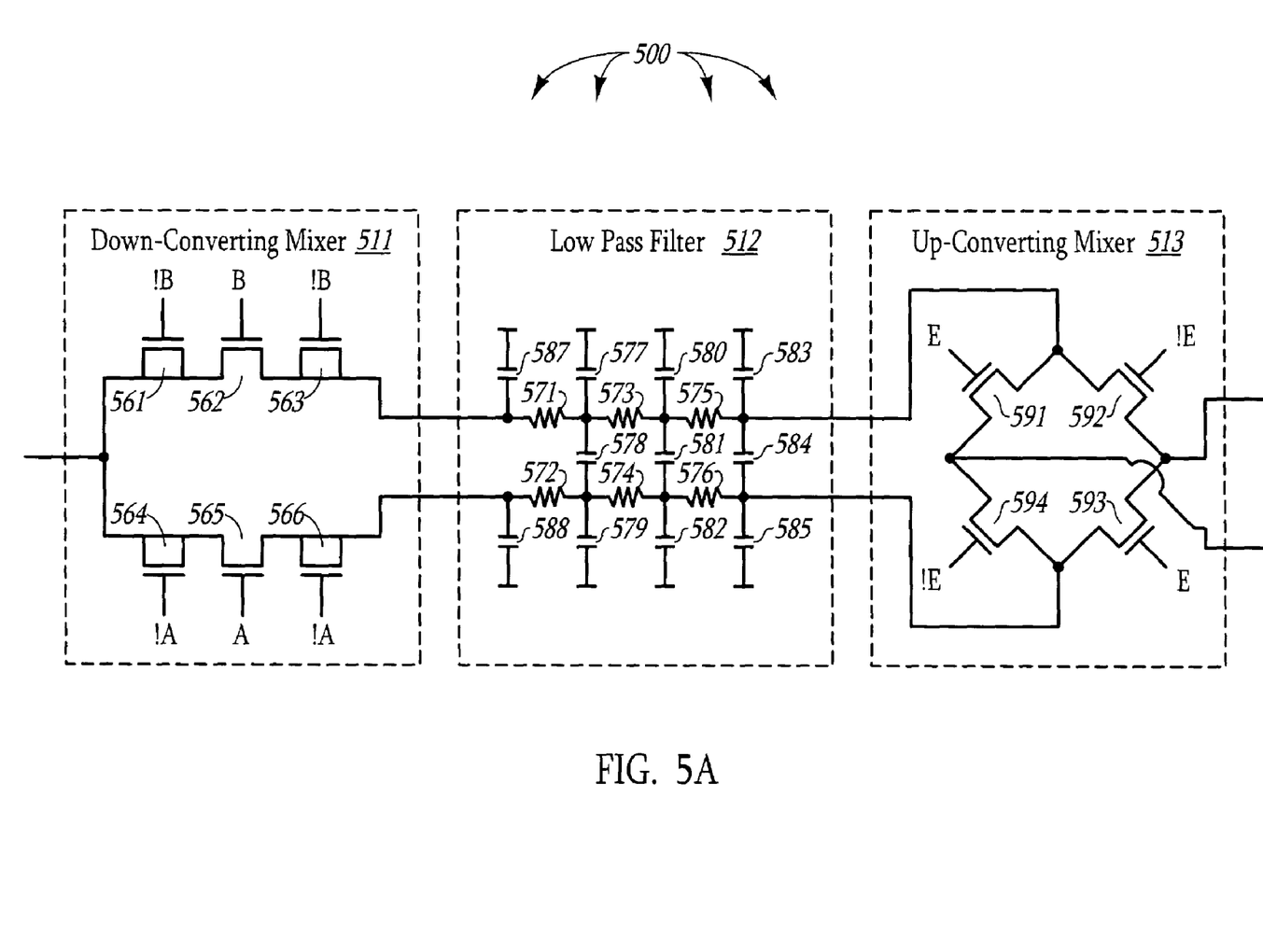
FIG. 5A illustrates a component-level circuit diagram showing further details of an embodiment of the down-converting mixer, a low pass filter, and an up-converting mixer that may be used in the circuit of FIG. 4 as passive elements.

FIG. 5A illustrates a specific embodiment 500 of an interconnected down-converting mixer 511, low pass filter 512, and up-converting mixer 513, which may be examples of down-converting mixer 411, low pass filter 412, and up-converting mixer 413, respectively, of FIG. 4.

The down-converting mixer 511 has one input terminal and two output terminals. Field-effect transistors 561 through 563 are coupled with their channel regions in series between the input terminal and the upper output terminal of the down-converting mixer 511. Field-effect transistors 564 through 566 are coupled with their channel regions in series between the input terminal and the lower output terminal of the down-converting mixer 511. Field effect transistors 561, 563, 564 and 566 have their source and drain connections shorted. To minimize charge injection while accomplishing down-conversion, down-converting control signal A is applied at the gate terminal of field-effect transistor 565, while down-converting control signal !A is applied at the gate terminal of field-effect transistors 564 and 566. Similarly, down-converting control signal B is applied at the gate terminal of field-effect transistor 562 while down-converting control signal !B is applied at the gate terminal of field-effect transistors 561 and 563.

As previously mentioned, the down-converting control signals A, B, !A, and !B may be cycled at about twice the carrier frequency of the received signal thereby reducing (or eliminating) DC offset introduced by the down-converting mixer 511. Additionally, second-order intermodulation product introduced by the down-converting mixer 511 may be reduced by the common mode rejection properties of downstream circuitry.

The low pass filter may be any passive low pass filter that includes one or more poles. However, in the illustrated embodiment, filter 512 is a resistor-capacitor circuit that has a low pass frequency response for each of the differential input signals. As will be apparent to those or ordinary skill in the art, the resistor-capacitor circuit has a frequency response that includes four poles. The low pass filter 512 may include resistors 571 through 576 and capacitors 577 through 587 configured as shown in FIG. 5A. By designing these resistor and capacitors with appropriate values, the position of those poles may be adjusted. In one embodiment, in order to obtain a high roll-off for better selectivity of the passed signal, the four poles are adjusted to be coincident so as to have an 80 dB per decade roll-off. The low pass filter 512 is a passive element and thus does not introduce new DC offset or 1/f noise into the signal, thereby preserving dynamic range.

The up-converting mixer 513 includes two input terminals, two output terminals, and four field-effect transistors 591 through 594. The field-effect transistor 591 has its channel region coupled between the upper input terminal and the lower output terminal of the up-converting mixer 513 and is controlled at its gate terminal by up-converting control signal E. The field-effect transistor 592 has its channel region coupled between the upper input terminal and the upper output terminal of the up-converting mixer 513 and is controlled at its gate terminal by up-converting control signal !E. The field-effect transistor 593 has its channel region coupled between the lower input terminal and the upper output terminal of the up-converting control signal E. The field-effect transistor 594 has its channel region coupled between the lower input terminal and the lower output terminal of the up-converting control signal !E.

Figure 5B:
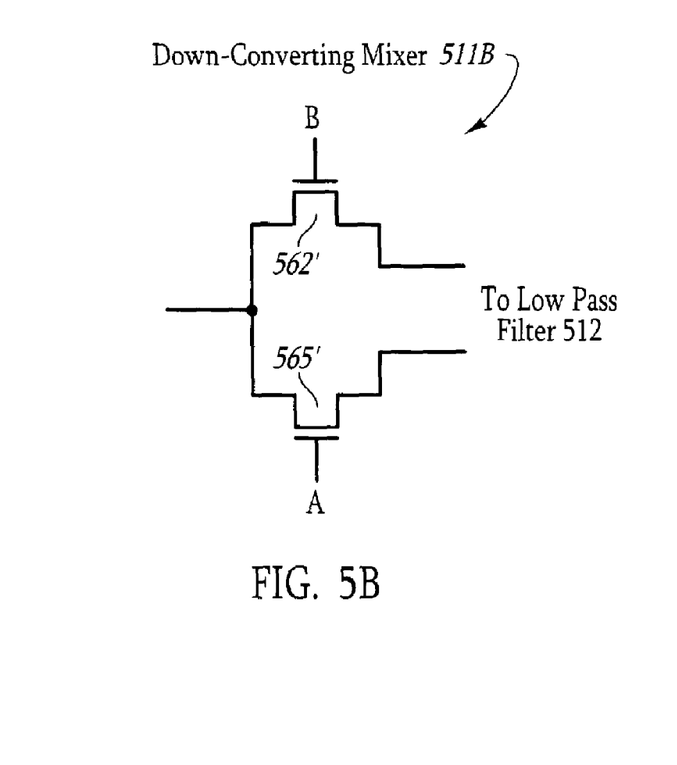
FIG. 5B illustrates a component-level circuit diagram showing an alternative structure for the down-converting mixer.

FIG. 5B illustrates an alternative embodiment of the down-converting mixer 511 in the form of down-converting mixer 511B. The down-converting mixer 511B is similar to the down-converting mixer 511, except that the field effect transistors 561, 563, 564 and 566 are not present, and field effect transistors 562' and 565' replace transistors 562 and 565.

Figure 5C:
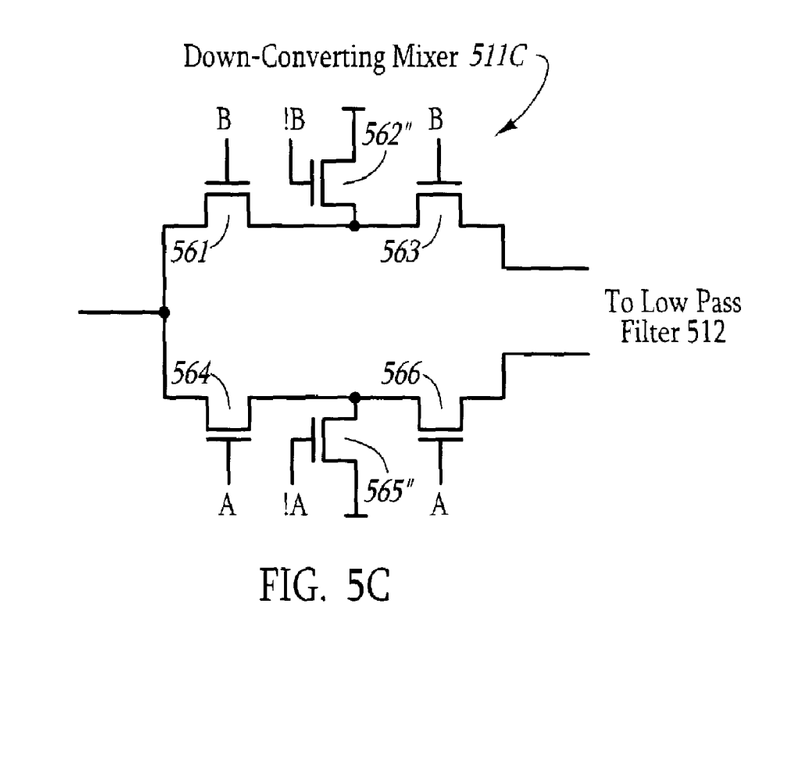
FIG. 5C illustrates a component-level circuit diagram showing a second alternative structure for the down-converting mixer.

FIG. 5C illustrates a second alternative embodiment of the down-converting mixer 511 in the form of down-converting mixer 511C. The down-converting mixer 511C is similar to the down-converting mixer 511, except that the field effect transistors 562" and 565" replace transistors 562 and 565.

Figure 6:
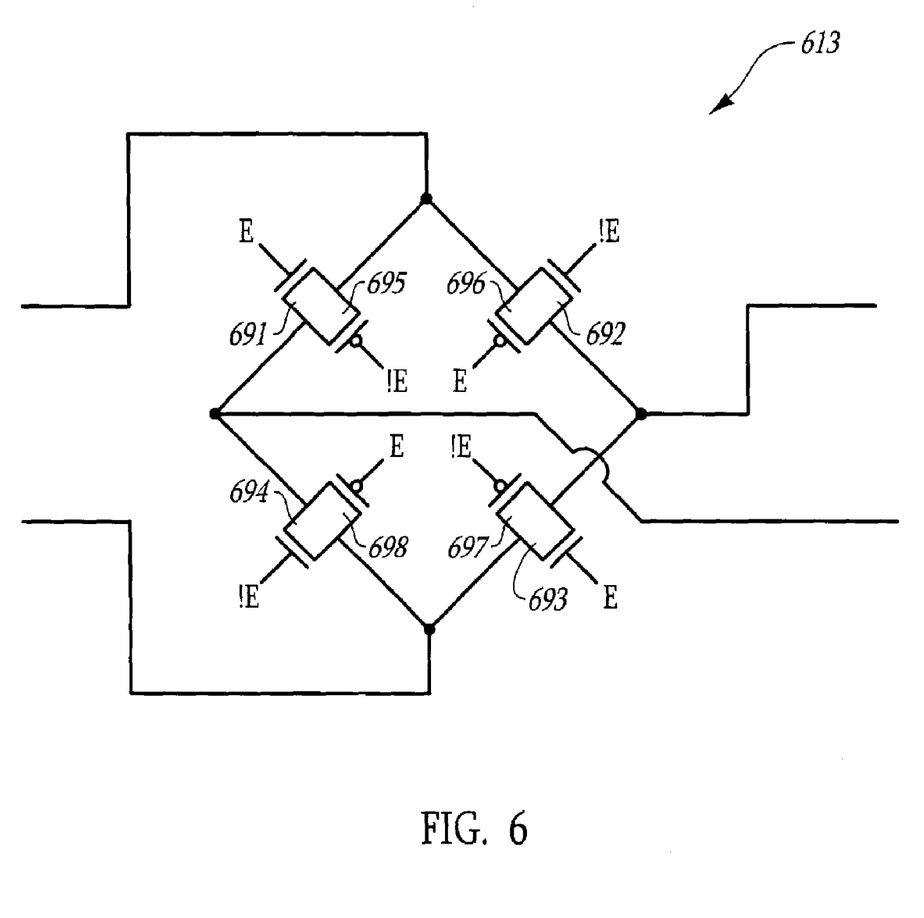
FIG. 6 illustrates a component-level circuit diagram showing further details of another embodiment of an up-converting mixer that may be used in the circuit of FIG. 4 as a passive element.

FIG. 6 illustrates an alternative structure 613 for the up-converting mixer 413. The up-converting mixer 613 includes field-effect transistors 691 through 694 which are configured the same as described above for respective transistors 591 through 594 in up-converting mixer 513. Additionally, the up-converting mixer 613 includes field-effect transistors 695 through 698 that have an opposite polarity as compared to respective field-effect transistors 691 through 694. For example, if field-effect transistors 691 through 694 are n-type field effect transistors as in the illustrated example, the field-effect transistors 695 through 698 would be p-type field effect transistors, and vice versa. Each of the field-effect transistors 695 through 698 are coupled between respective input terminal and respective output terminals as described above for corresponding field-effect transistors 591 through 594. In order to maximize dynamic range, the dc offsets at the input and output terminals of the up-converting mixer 613 should all be midway between the supply voltages Vdd and Vss.

Accordingly, the principles of the present invention allow for more adaptive control over antenna and receiver selection that takes into account current circumstances. All receivers, less than all, or even just one received signal may be used. Furthermore, the receivers may implement direct receiver architectures in which up-conversion of the baseband signal occurs after down-conversion thereby reducing DC offset and 1/f noise. Furthermore, all of the components described above may be implemented using standard CMOS technology and thus may be integrated on the same chip even though multiple receivers are involved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A diversity receiver circuit comprising the following:
    a first receiver configured to receive a first representation of a signal on a first antenna and process the first representation of the signal;
    a second receiver configured to receive a second representation of the signal on a second antenna and process the second represent of the signal; and
    means for adaptively phase shift summing the processed first and second representations of the signal only if the processed first and second representations have sufficient strength, and otherwise selecting only one of the processed first and second representations of the signal for further processing.

2. A diversity receiver circuit in accordance with claim 1, wherein each element of the diversity receiver circuit is fabricated on a single integrated die.

3. A diversity receiver circuit in accordance with claim 1, wherein the means for adaptively phase shift summing the processed first and second representations of the signal only if the processed first and second representations have sufficient strength, and otherwise selecting only one of the processed first and second representations of the signal for further processing comprise the following:
    a phase shifter configured to receive the processed first representation of the signal at least when the processed first representation of the signal exceeds a first threshold value, the phase shifter further configured to generate a phase shifted version of the processed first representation of the signal at least when the processed first representation of the signal exceeds the first threshold value; and
    a summer configured to sum the phase shifted version of the processed first representation of the signal with the processed second representation of the signal at least when both of the following conditions are true:
        the processed first representation of the signal exceeds the first threshold value, and
        the processed second representation of the signal exceeds a second threshold value.

4. A diversity receiver circuit in accordance with claim 3, wherein the first and second threshold values are the same threshold value.

5. A diversity receiver circuit in accordance with claim 3, wherein the first and second threshold values are different threshold values.

6. A diversity receiver circuit in accordance with claim 3, further comprising the following:
    a first comparator configured to receive and compare the processed first representation of the signal and the first threshold value, the first comparator configured to couple the processed first representation of the signal with the phase shifter if the processed first representation of the signal exceeds the first threshold value.

7. A diversity receiver circuit in accordance with claim 6, further comprising the following:
    a second comparator configured to receive and compare the processed second representation of the signal and the second threshold value, the second comparator configured to couple the processed second representation of the signal with the summer when the processed second representation of the signal exceeds the second threshold value.

8. A diversity receiver circuit in accordance with claim 7, wherein the phase shifter is a first phase shifter, the diversity receiver circuit further comprising the following:
    a second phase shifter configured to receive the processed second representation of the signal at least when the processed second representation of the signal exceeds the second threshold value, the second phase shifter further configured to generate a phase shifted version of the processed second representation of the signal at least when the processed second representation of the signal exceeds the second threshold value.

9. A diversity receiver circuit in accordance with claim 8, wherein the summer is configured to sum the phase shifted version of the processed first representation of the signal and the phase shifted version of the processed second representation of the signal at least when both of the following conditions are true:
   the processed first representation of the signal exceeds the first threshold value, and
   the processed second representation of the signal exceeds a second threshold value.

10. A diversity receiver circuit in accordance with claim 8, further comprising the following:
   a phase detector configured to detect when the phase shifted version of the processed first representation of the signal is out of phase with the phase shifted version of the processed second representation of the signal, and is configured to control either or both of the first phase shifter and the second phase shifter so that the processed first and second representations of the signal received by the summer tend to be towards a relatively fixed phase shift with each other.

11. A diversity receiver circuit in accordance with claim 8, wherein the relatively fixed phase shift is approximately ninety degrees.

12. A diversity receiver circuit in accordance with claim 1, further comprising the following:
   a third receiver configured to receive a third representation of a signal on a third antenna and process the third representation of the signal,
   wherein the means for phase shift summing comprises a mean for phase shift summing the processed first, second, and third representations of the signal only if the processed first, second, and third representations have sufficient strength, and otherwise selecting less than all of the processed first, second and third representations of the signal for further processing.

13. A diversity receiver circuit in accordance with claim 1, wherein the first receiver is a direct conversion receiver having an in-phase branch and a quadrature-phase branch.

14. A diversity receiver circuit in accordance with claim 13, wherein the direct conversion receiver comprises the following:
   an in-phase amplifier configured to receive and amplify an in-phase differential signal that represents an in-phase portion of the processed first representation of the signal;
   an in-phase summer configured to receive and sum the amplified in-phase differential signal;
   a quadrature-phase amplifier configured to receive and amplify the quadrature-phase differential signal that represents a quadrature-phase portion of the processed first representation of the signal;
   a quadrature-phase summer configured to receive and sum the amplified quadrature-phase differential signal, and
   a limiting amplifier configured to receive and amplify in a limited fashion the difference between the summed in-phase signal and the summed quadrature-phase signal.

15. A diversity receiver circuit in accordance with claim 14, wherein the direct conversion receiver further comprising the following:
   a band pass filter configured to receive and filter the limit amplified signal.

16. A diversity receiver circuit in accordance with claim 15, wherein the direct conversion receiver further comprises the following:
   an in-phase down-converting mixer that is configured to down-convert a received modulated signal to thereby generate an in-phase portion of a baseband signal;
   an in-phase low pass filter that is coupled to the in-phase down-converting mixer so as to filter high frequency components of the in-phase down-converted signal to thereby generate an in-phase filtered down-converted signal;
   an in-phase up-converting mixer that is coupled to the in-phase low pass filter so as to receive and up-convert the in-phase filtered down-converted signal to generate the in-phase differential signal, wherein there are no active components that operate on the in-phase down-converted signal prior to being up-converted;
   a quadrature-phase down-converting mixer that is configured to down-convert the received modulated signal to thereby generate a quadrature-phase portion of the baseband signal;
   a quadrature-phase low pass filter that is coupled to the quadrature-phase down-converting mixer so as to filter high frequency components of the quadrature-phase down-converted signal to thereby generate a quadrature-phase down-converted signal; and
   a quadrature-phase up-converting mixer that is coupled to the quadrature-phase low pass filter so as to receive and up-convert the quadrature-phase filtered down-converted signal to generate the quadrature-phase differential signal, wherein there are no active components that operate on the quadrature-phase down-converted signal prior to being up-converted.

17. A diversity receiver circuit comprising the following:
   a first receiver configured to receive a first representation of a signal on a first antenna and process the first representation of the signal;
   a second receiver configured to receive a second representation of the signal on a second antenna and process the second represent of the signal;
   a phase shifter configured to receive the processed first representation of the signal at least when the processed first representation of the signal exceeds a first threshold value, the phase shifter further configured to generate a phase shifted version of the processed first representation of the signal at least when the processed first representation of the signal exceeds the first threshold value; and
   a summer configured to sum the phase shifted version of the processed first representation of the signal with the processed second representation of the signal at least when both of the following conditions are true:
      the processed first representation of the signal exceeds the first threshold value, and
      the processed second representation of the signal exceeds a second threshold value.

18. A diversity receiver circuit in accordance with claim 17, wherein each element of the diversity receiver circuit is fabricated on a single integrated die.

19. A diversity receiver circuit in accordance with claim 17, further comprising the following:
   a first comparator configured to receive and compare the processed first representation of the signal and the first threshold value, the first comparator configured to couple the processed first representation of the signal with the phase shifter if the processed first representation of the signal exceeds the first threshold value.

20. A diversity receiver circuit in accordance with claim 19, further comprising the following:
   a second comparator configured to receive and compare the processed second representation of the signal and the second threshold value, the second comparator configured to couple the processed second representation of the signal with the summer when the processed second representation of the signal exceeds the second threshold value.

21. A diversity receiver circuit in accordance with claim 20, wherein the phase shifter is a first phase shifter, the diversity receiver circuit further comprising the following:
a second phase shifter configured to receive the processed second representation of the signal at least when the processed second representation of the signal exceeds the second threshold value, the second phase shifter further configured to generate a phase shifted version of the processed second representation of the signal at least when the processed second representation of the signal exceeds the second threshold value.

22. A diversity receiver circuit in accordance with claim 21, wherein the summer is configured to sum the phase shifted version of the processed first representation of the signal and the phase shifted version of the processed second representation of the signal at least when both of the following conditions are true:
the processed first representation of the signal exceeds the first threshold value, and
the processed second representation of the signal exceeds a second threshold value.

23. A diversity receiver circuit in accordance with claim 21, further comprising the following:
a phase detector configured to detect when the phase shifted version of the processed first representation of the signal is out of phase with the phase shifted version of the processed second representation of the signal, and is configured to control either or both of the first phase shifter and the second phase shifter so that the processed first and second representations of the signal received by the summer tend to be towards a relatively fixed phase shift with each other.

24. A diversity receiver circuit in accordance with claim 21, wherein the relatively fixed phase shift is approximately ninety degrees.

25. A diversity receiver circuit in accordance with claim 17, further comprising the following:
a third receiver configured to receive a third representation of a signal on a third antenna and process the third representation of the signal,
wherein the means for phase shift summing comprises a mean for phase shift summing the processed first, second, and third representations of the signal only if the processed first, second, and third representations have sufficient strength, and otherwise selecting less than all of the processed first, second and third representations of the signal for further processing.

26. A diversity receiver circuit in accordance with claim 17, wherein the first receiver is a direct conversion receiver having an in-phase branch and a quadrature-phase branch.

27. A diversity receiver circuit in accordance with claim 26, wherein the direct conversion receiver comprises the following:
an in-phase amplifier configured to receive and amplify an in-phase differential signal that represents an in-phase portion of the processed first representation of the signal;
an in-phase summer configured to receive and sum the amplified in-phase differential signal;
a quadrature-phase amplifier configured to receive and amplify the quadrature-phase differential signal that represents a quadrature-phase portion of the processed first representation of the signal;
a quadrature-phase summer configured to receive and sum the amplified quadrature-phase differential signal, and
a limiting amplifier configured to receive and amplify in a limited fashion the difference between the summed in-phase signal and the summed quadrature-phase signal.

28. A diversity receiver circuit in accordance with claim 27, wherein the direct conversion receiver further comprising the following:
a band pass filter configured to receive and filter the limit amplified signal.

29. A diversity receiver circuit in accordance with claim 28, wherein the direct conversion receiver further comprises the following:
an in-phase down-converting mixer that is configured to down-convert a received modulated signal to thereby generate an in-phase portion of a baseband signal;
an in-phase low pass filter that is coupled to the in-phase down-converting mixer so as to filter high frequency components of the in-phase down-converted signal to thereby generate an in-phase filtered down-converted signal;
an in-phase up-converting mixer that is coupled to the in-phase low pass filter so as to receive and up-convert the in-phase filtered down-converted signal to generate the in-phase differential signal, wherein there are no active components that operate on the in-phase down-converted signal prior to being up-converted;
a quadrature-phase down-converting mixer that is configured to down-convert the received modulated signal to thereby generate a quadrature-phase portion of the baseband signal;
a quadrature-phase low pass filter that is coupled to the quadrature-phase down-converting mixer so as to filter high frequency components of the quadrature-phase down-converted signal to thereby generate a quadrature-phase down-converted signal; and
a quadrature-phase up-converting mixer that is coupled to the quadrature-phase low pass filter so as to receive and up-convert the quadrature-phase filtered down-converted signal to generate the quadrature-phase differential signal, wherein there are no active components that operate on the quadrature-phase down-converted signal prior to being up-converted.

* * * * *

UNITED STATES PATENT AND TRADEMARK OFFICE
CERTIFICATE OF CORRECTION

PATENT NO. : 7,006,809 B2
APPLICATION NO. : 10/430455
DATED : February 28, 2006
INVENTOR(S) : Petrov et al.

Page 1 of 1

It is certified that error appears in the above-identified patent and that said Letters Patent is hereby corrected as shown below:

Column 2
Line 37, change "receive" to --received--

Column 3
Line 31, change "ion" to --description--
Line 32, after "may be learned" insert --by the--
Line 34, after "may be" insert --realized--
Line 35, change "pended" to --in the appended--

Column 5
Line 61, after "and" insert --2)--

Column 7
Line 6, change "114" to --314--
Line 8, change "112A" to --112B--
Line 56, change "or" to --of--

Column 8
Line 24, after "output" insert --which--

Column 9
Line 56, change "423" to --421--
Line 61, change "427" to --417--
Line 61, change "capacitors" to --capacitor--

Signed and Sealed this

Fifth Day of June, 2007

JON W. DUDAS
*Director of the United States Patent and Trademark Office*